Sept. 3, 1946.  G. H. ROSENBOOM  2,407,101
PIPE CUTTING AND TENONING MACHINE
Filed Dec. 23, 1943   2 Sheets-Sheet 1
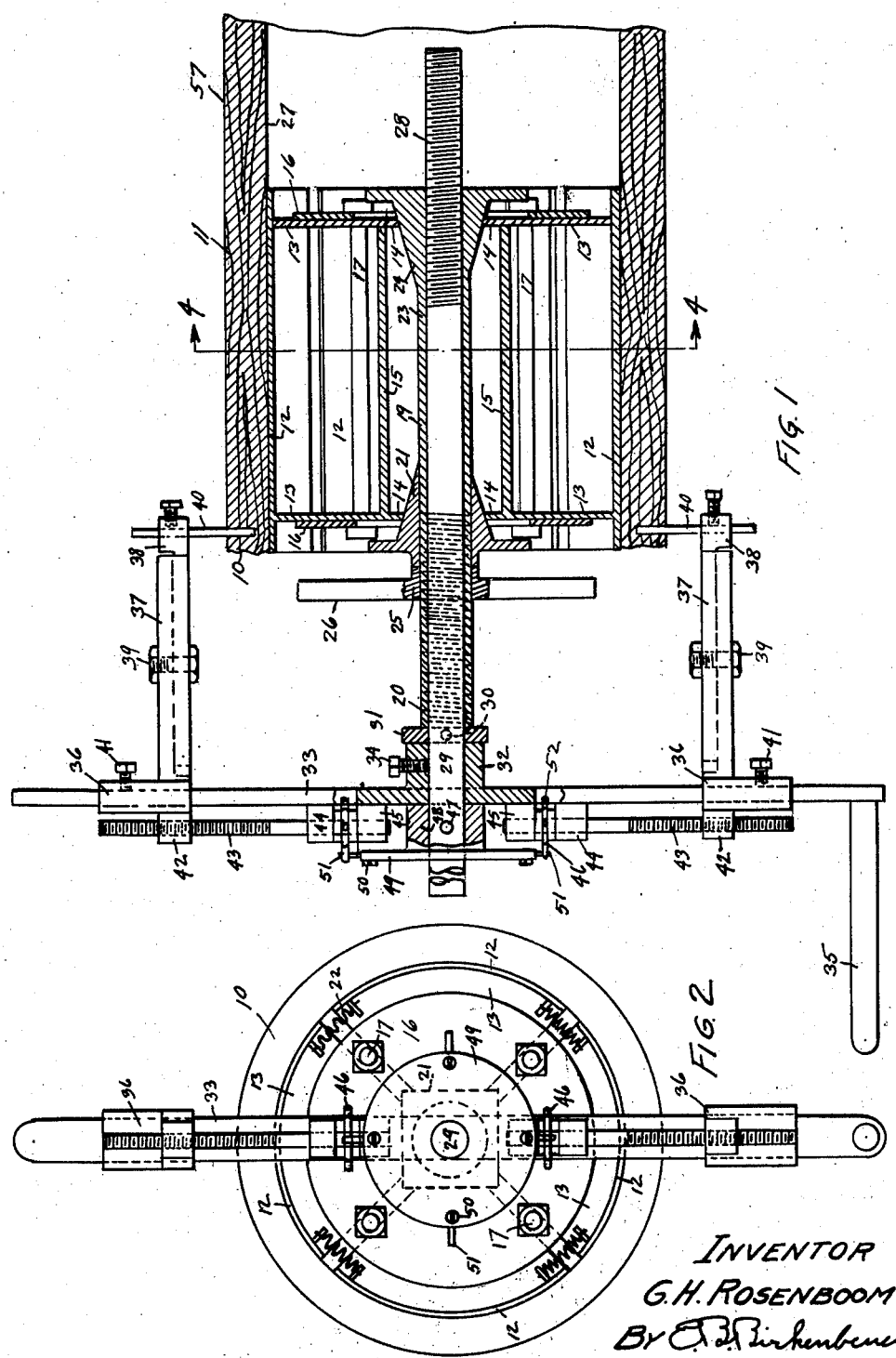

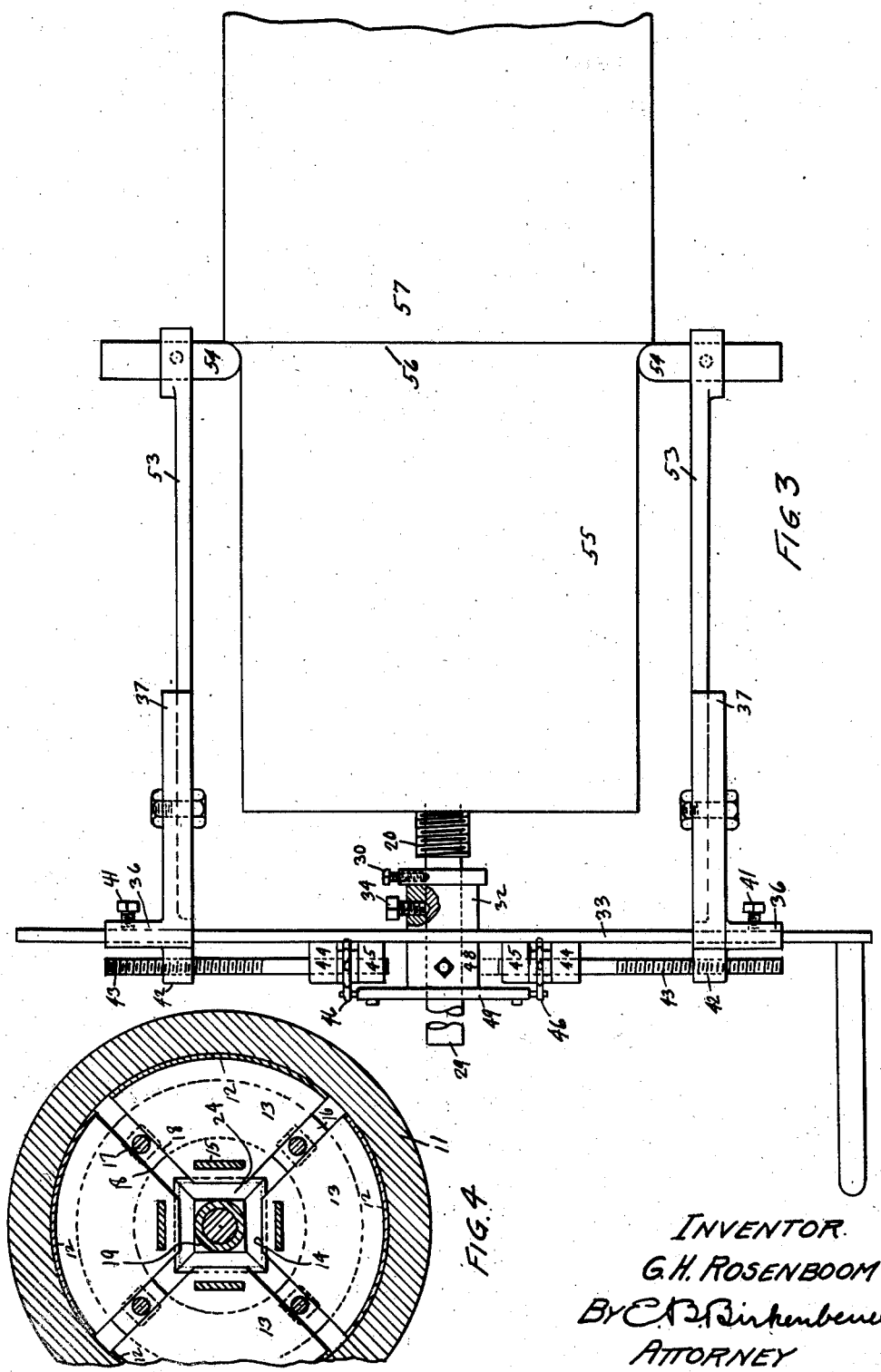

Patented Sept. 3, 1946

2,407,101

UNITED STATES PATENT OFFICE 2,407,101

PIPE CUTTING AND TENONING MACHINE

Gustaf H. Rosenboom, Kalama, Wash.

Application December 23, 1943, Serial No. 515,459

1 Claim. (Cl. 144—205)

This invention relates generally to conduits for fluids and particularly to a pipe cutting and tenoning machine.

The main object of this invention is to devise a light weight portable and inexpensive machine for tenoning wooden as well as composition pipes and for cutting off metal, wooden or composition pipe.

The second object is to provide a compact machine especially adapted for manual operation whereby a tenon can be easily and accurately formed on the end of a pipe without resorting to the use of a lathe or other heavy or expensive equipment.

The third object is to facilitate the laying of wooden and composition pipe by making it possible to obtain any number of short lengths required for the purpose of producing a desired curvature in the pipe line.

A further object is to reduce the amount of breakage by avoiding the necessity of transporting pipe sections between the point of laying and a remote work shop, as is now commonly the case.

These and other objects will become more apparent from the specification following, as illustrated in the accompanying drawings, in which:

Fig. 1 is a longitudinal section through the device in position for pipe cutting.

Fig. 2 is an end elevation of Fig. 1.

Fig. 3 is a side elevation of the device in position for tenoning, showing the position of the parts at the finish of a tenoning operation.

Fig. 4 is a transverse section taken along the line 4—4 in Fig. 1.

Similar numbers of references refer to the same or similar parts throughout the several views.

Referring in detail to the drawings, there is shown in Fig. 1 the uneven end 10 of a pipe section 11 which may be of wood, metal or any other material.

My device consists essentially of three elements, namely a centering cylinder, a bearing and feed screw supported by the cylinder and a rotatable cutting element supported by the feed screw.

The centering cylinder consists of a plurality of segments 12, near each end of each of which is a secured sector 13, whose innermost ends 14 are joined by the tie bar 15. On the outermost sides of the sectors 13 are placed the rings 16, which are held somewhat loosely in position by the bolts 17 which pass between the sides 18 of the sectors 13.

The inner ends 14 are straight or perpendicular to the median plane of the sector 13 and since there are four sectors 13 at each end of the cylinder they form a square opening at each end of the center thereof.

Extending axially through the segments 12 is a tube 19 whose end 20 is externally threaded and passes loosely through the four-sided wedge 21 against which rests the sector ends 14 under the urging of the tension springs 22 which tend to collapse the segments 12.

The end 23 of the tube 19 is welded or otherwise secured to an opposing wedge 24. A handled nut 25 is mounted on the threaded portion 20 and it follows that the rotation of the handles 26 with relation to the tube 19 in one direction will move the wedges 21 and 24 toward each other and to expand the segments 12 until they engage and clamp the interior 27 of the pipe section 11, and since this expansion is uniform about the central axis of the tube 19, it follows that the tube 19 is concentric with relation to the pipe 11.

The wedge 24 is internally threaded and receives the threaded end 28 of the shaft 29, which extends beyond the end 20 of the tube 19 and has secured thereon by means of a set screw 30 a collar 31.

Rotatably mounted on the shaft 29 is a hub 32 of the operating lever 33. The hub 32 is provided with a set screw 34 which is tightened on the shaft 29 for tenoning operations, but loosened for pipe cutting operations as shown in Fig. 1.

At one end of the lever 33 is secured a handle 35 by means of which the bar 33 may be rotated. On each end of the bar 33 is mounted a slide 36 to whose projecting arm 37 is adjustably secured a tool carrying arm 38 by means of a bolt 39.

In Fig. 1 there is shown a cut-off tool 40, the exact nature of which will depend upon the character of the material in the pipe 11. A set screw 41 is provided on the slide 36 but it is loosened during the cut-off operation shown in Fig. 1.

On each slide 36 is formed a threaded bearing 42 through which extends a screw 43, whose opposite end journals in the bearings 44 and 45 which are secured on the bar 33. A toothed wheel 46 is secured on the screw 43 between the bearings 44 and 45.

Releasably secured on the shaft 29 by means of the set screw 47 is the hub 48 on whose outer side is formed a flange 49 on which may be secured by means of the screws 50 the pins 51 which are adapted to engage the teeth 52 of the wheel 46.

In the operation of the device as a cut-off implement it is first necessary to insert the centering cylinder of which the segments 12 form a part, into the end of the pipe 11 whose end 10 is to be trimmed straight and then to secure the cylinder in the pipe, as described above. The shaft 29 is then rotated by means of the handle 35 until the collar 31 is against the end 20 of the tube 19, which locks the shaft 29 against rotation with relation to the tube 19 and the pipe.

Now the screw 34 is released and the screw 47 is tightened and the proper cut-off tools 40 are put in position, which can be selectively determined and controlled by means of the bolts 39. It follows that if the handle 35 is made to revolve in a circular orbit around the shaft 29, then the toothed wheels 46 are also made to revolve and as their teeth 52 engage the pins 51 projecting from the flange 49 they impart rotation to the screws 43 moving, in this case, the tools 40 toward the work. The rate of feed will of course be determined by the kind of material, the size of pipe, and other factors and can be easily varied by changing the number of pins 51 projecting from the flange 49.

In the form of the device shown in Fig. 3 the parts are identical except that the tool holding bars 53 carry round nose tools 54 which terminate the tenon 55 by means of a rounded shoulder 56, also the tenon 55 is left practically smooth while the exterior 57 may be rough or covered with reinforcing bands or irons.

When used as shown in Fig. 3 it will be observed that the collar 31 does not touch the tube 19, that is the shaft 29 is free to rotate within the tube 19. In this case the set screw 34 is tightened so that the rotation of the lever 33 will cause a corresponding rotation of the shaft 29, whose end 28 being threaded into the wedge 24 causes the entire bar 33 and the attached tool holding bars 53 to be moved longitudinally as well as circumferentially.

It will also be noted that since the flange 49 and the lever 33 are both secured on the same shaft 29, that there is no relative movement between the parts and no motion is imparted to the screws 43 by the rotation of the lever 33.

It will also be noted that should it be desired to set either of the tools 54 this can be accomplished by manually rotating the toothed wheel 46, after which the set screw 41 is tightened to prevent any change in position. Obviously, any other form of feeding mechanism may be employed without departing from the spirit of this invention.

Also, while I have shown the device as manually operated, it could be power driven without departing from the spirit of this invention.

While I have illustrated a specific form of expanding mandrel, it must be understood that any other means for holding the shaft 29 concentric with relation to the pipe 11 could be employed without departing from the spirit of this invention.

I claim:

A device of the class described having in combination an expanding mandrel having a journal formed along the axis thereof, one end of said journal being threaded internally, a shaft disposed within said journal having a threaded end which occupies the threaded portion of said journal, a collar fixed on said shaft adapted to lock against the end of said journal, an operating lever rotatably mounted on said shaft adjacent to said collar, means for drivably connecting said lever to said shaft, tool carrying arms mounted on said lever, a screw feed for each of said arms, gearing between said shaft and screw feeds for operating the screw feeds as the operating lever is revolved with relation to said shaft.

GUSTAF H. ROSENBOOM.